(12) United States Patent
Brown et al.

(10) Patent No.: US 7,318,851 B2
(45) Date of Patent: Jan. 15, 2008

(54) FILTER ELEMENT

(75) Inventors: Gene W. Brown, Franklin, TN (US); Steven J. Merritt, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 418 days.

(21) Appl. No.: 10/979,876

(22) Filed: Nov. 2, 2004

(65) Prior Publication Data

US 2006/0090434 A1    May 4, 2006

(51) Int. Cl.
*B01D 46/00* (2006.01)
(52) U.S. Cl. .......................... 55/498; 55/502; 55/500; 55/509; 55/511; 55/521; 55/493; 454/158; 95/286; 95/287
(58) Field of Classification Search .................. 55/498, 55/502, 500, 509, 511, 521, 493; 454/158; 95/286, 287
See application file for complete search history.

(56) References Cited

U.S. PATENT DOCUMENTS

| | | | |
|---|---|---|---|
| 3,025,963 A | | 3/1962 | Bauer |
| 3,397,518 A | | 8/1968 | Rogers |
| 4,498,989 A | | 2/1985 | Miyakawa et al. |
| 4,589,983 A | | 5/1986 | Wydevan |
| 4,720,292 A | | 1/1988 | Engel et al. |
| 5,238,474 A | | 8/1993 | Kahlbaugh et al. |
| 5,472,379 A | * | 12/1995 | Andress et al. ............. 454/158 |
| 5,484,466 A | | 1/1996 | Brown et al. |
| 5,685,985 A | | 11/1997 | Brown et al. |
| 5,720,790 A | | 2/1998 | Kometani et al. |
| 5,792,247 A | | 8/1998 | Gillingham et al. |
| 5,820,646 A | | 10/1998 | Gillingham et al. |
| 5,895,574 A | | 4/1999 | Friedmann et al. |
| 5,902,364 A | | 5/1999 | Tokar et al. |

(Continued)

FOREIGN PATENT DOCUMENTS

JP      S60-112320      7/1985

(Continued)

OTHER PUBLICATIONS

U.S. Appl. No. 10/979,401, filed Nov. 2, 2004, Brown.

(Continued)

*Primary Examiner*—Duane Smith
*Assistant Examiner*—Minh-Chau T. Pham
(74) *Attorney, Agent, or Firm*—Reinhart Boerner Van Deuren P.C.

(57) ABSTRACT

A filter element, and filter apparatus, include a filter pack, a seal member, and a seal support frame operatively connecting the seal member to the filter pack. The seal support frame includes an annular extension, which is preferably canted at an oblique angle to a longitudinal axis, for supporting the seal member. The seal support frame also preferably includes a first end thereof including the annular extension, and a second end thereof spaced from the first end thereof along the longitudinal axis, with the first and second ends of the seal support frame joined by a hub of the outer peripheral sidewall of the seal support frame to define a cavity within the seal support frame for receiving the filter pack. The first and second ends of the seal support frame, and the filter pack are preferably joined and sealed to one another by a single bead of adhesive.

46 Claims, 9 Drawing Sheets

U.S. PATENT DOCUMENTS

| | | |
|---|---|---|
| 6,179,890 B1 | 1/2001 | Ramos et al. |
| 6,190,432 B1 | 2/2001 | Gieseke et al. |
| 6,221,122 B1 | 4/2001 | Gieseke et al. |
| 6,235,195 B1 | 5/2001 | Tokar |
| 6,368,374 B1 | 4/2002 | Tokar et al. |
| 6,447,567 B1 | 9/2002 | Ehrenberg |
| 6,517,598 B2 * | 2/2003 | Anderson et al. ............ 55/498 |
| 6,533,845 B2 | 3/2003 | Tokar et al. |
| 6,610,117 B2 | 8/2003 | Gieseke et al. |
| 6,610,126 B2 | 8/2003 | Xu et al. |
| 6,610,177 B2 | 8/2003 | Tsay et al. |
| 6,673,136 B2 | 1/2004 | Gillingham et al. |
| 6,706,087 B1 | 3/2004 | Gebler et al. |
| 6,743,317 B2 | 6/2004 | Wydeven |
| 6,746,518 B2 | 6/2004 | Gieseke et al. |
| 6,783,565 B2 | 8/2004 | Gieseke et al. |
| 6,966,940 B2 | 11/2005 | Krisko et al. |
| 2002/0100262 A1 | 8/2002 | Gieseke et al. |
| 2003/0146149 A1 | 8/2003 | Binder et al. |
| 2003/0217534 A1 | 11/2003 | Krisko et al. |
| 2005/0166561 A1 | 8/2005 | Schrage et al. |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |

FOREIGN PATENT DOCUMENTS

| | | |
|---|---|---|
| JP | S60-124622 | 8/1985 |
| JP | 63-122617 | 6/1988 |
| JP | HEI 2-31131 | 8/1990 |

OTHER PUBLICATIONS

U.S. Appl. No. 10/979,987, filed Nov. 3, 2004, Johnston.
U.S. Appl. No. 11/355,064, filed Feb. 15, 2006, Wydeven et al.
U.S. Appl. No. 11/357,788, filed Feb. 17, 2006, Merritt.

* cited by examiner

FILTER ELEMENT

FIELD OF THE INVENTION

This invention relates to fluid filters, and more particularly to filters having a housing adapted for receiving a filter element including a seal member for sealing a juncture between the filter housing and the filter element when the filter element is installed in filter housing.

BACKGROUND OF THE INVENTION

Filters of the type used for filtering particulate matter from fluid sometimes include a filter housing having an inlet for receiving the fluid with entrained particulate matter, and an outlet for delivering the filtered fluid to a device needing fluid that is free of particulate matter. For example, a filter may be provided at the air inlet of an engine or an air compressor to remove dust, water, or other particulate matter that could cause damage to the engine or compressor if it were not removed from the air entering the engine or compressor.

In such filters, the particulate matter is typically removed by a filter element that is installed within the filter housing in such a manner that the fluid must flow through a filter element, including a filter pack of porous filter material, which removes the particulate matter from the fluid. Over time, the filter pack of the filter element becomes plugged or coated with particulate matter, necessitating removal and replacement of the filter element in order for the filter to continue in its function of supplying particulate-free fluid at the outlet of the housing.

In order to facilitate removal and replacement of the filter element, it is known to configure the filter housing to include a generally tubular wall section thereof, and provide a seal member mounted on the filter element that seals the juncture between an inner surface of the tubular wall section and the filter element, when the filter element is inserted into the housing, so that the fluid cannot bypass the filter element while flowing through the housing. Prior approaches to providing such sealing arrangement are disclosed in U.S. Pat. No. 6,190,432, to Gieske, et al., and in U.S. Pat. No. 6,517,598 B2, to Anderson, et al.

It is desirable to provide an improved filter element and filter apparatus, having a filter element and sealing arrangement that are more robust than the arrangements used in prior filters. It is also desirable to provide such an improved filter element and filter apparatus in a form that can be manufactured in a more straight-forward and lower cost manner than prior filter elements and filter apparatuses.

BRIEF SUMMARY OF THE INVENTION

The invention provides an improved filter element and filter apparatus through use of a filter element that includes a filter pack, a seal member, and a seal support frame operatively connecting the seal member to the filter pack.

According to one aspect of the invention, the filter pack has first and second oppositely facing flow faces, and defines a longitudinal axis passing through the first and second flow faces. The seal support frame includes a canted annular extension thereof, for supporting the seal member. Having the seal support canted provides a more robust structure that is more inherently capable of withstanding radial and axial forces on the seal member during installation, removal, and operation of the filter element.

The canted annular extension projects from one of the first and second flow faces at an oblique angle to the longitudinal axis, and has a first end and a distal end thereof. The seal support frame further includes an inwardly canted intermediate annular segment that extends between the first end of the canted annular extension and the one of the first and second flow faces of the filter pack. The intersection of the first end of the canted annular extension and the inwardly canted intermediate annular section forms a V-shaped, outwardly opening, annular groove at the juncture of the canted annular extension and the inwardly canted intermediate annular segment.

According to another aspect of the invention, the filter pack has an outer periphery thereof joining first and second oppositely facing flow faces, and defining a longitudinal axis passing through the first and second flow faces. The seal support frame has an outer peripheral sidewall, adapted for circumscribing the outer periphery of the filter pack. The seal support frame may also have a first end thereof including an annular extension, and a second end thereof spaced from the first end thereof along the longitudinal axis, with the first and second ends of the seal support frame joined by the outer peripheral sidewall of the seal support frame to define a cavity within the seal support frame for receiving the filter pack. Having the filter pack disposed in the cavity of the seal support frame provides significant additional protection for the filter pack, during installation, removal, and operation of the filter element.

According to a further aspect of the invention, the outer peripheral sidewall may include a first and a second section thereof, with the first section extending from one of the first or second ends of the seal support frame and terminating in a distal end of the first section of the outer peripheral sidewall, and the second section thereof extending from the other of the first and second ends of the seal support frame and terminating in a distal end of the second section of the outer peripheral sidewall. The first and second sections of the outer peripheral sidewall are joined together by a hub extending from the distal end of one of the first or second sections of the outer peripheral sidewall, with the hub being adapted for receiving the distal end of the other of the first and second sections of the outer peripheral sidewall.

The distal ends of the first and second sections of the outer peripheral side wall may be joined and sealed to the outer periphery of the filter pack by a single bead of adhesive forming a common bond and seal between the distal ends of the first and second sections of the outer peripheral sidewall of the seal support frame and the outer periphery of the filter pack. Having the components of the filter element configured to allow use of a single adhesive bead for simultaneously joining the first and second sections of the outer sidewall of the seal support member to one another and to the outer periphery of the filter pack, according to the invention, significantly facilitates manufacture of the filter element by eliminating the need for applying multiple adhesive beads as is required in the manufacture of prior filter elements.

The invention may take the form of a filter apparatus including a housing and a filter element according to the invention. A filter element or filter apparatus, according to the invention, may include a filter pack having a plurality of flutes of porous filter media, and additional features for facilitating manufacture of a filter element or apparatus according to the invention. The invention may be practiced with efficacy in filters using elements formed in a variety of cross sectional shapes including circular, race-track-like, oblong or rectangular.

Other aspects, objectives and advantages of the invention will be apparent from the following detailed description and the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
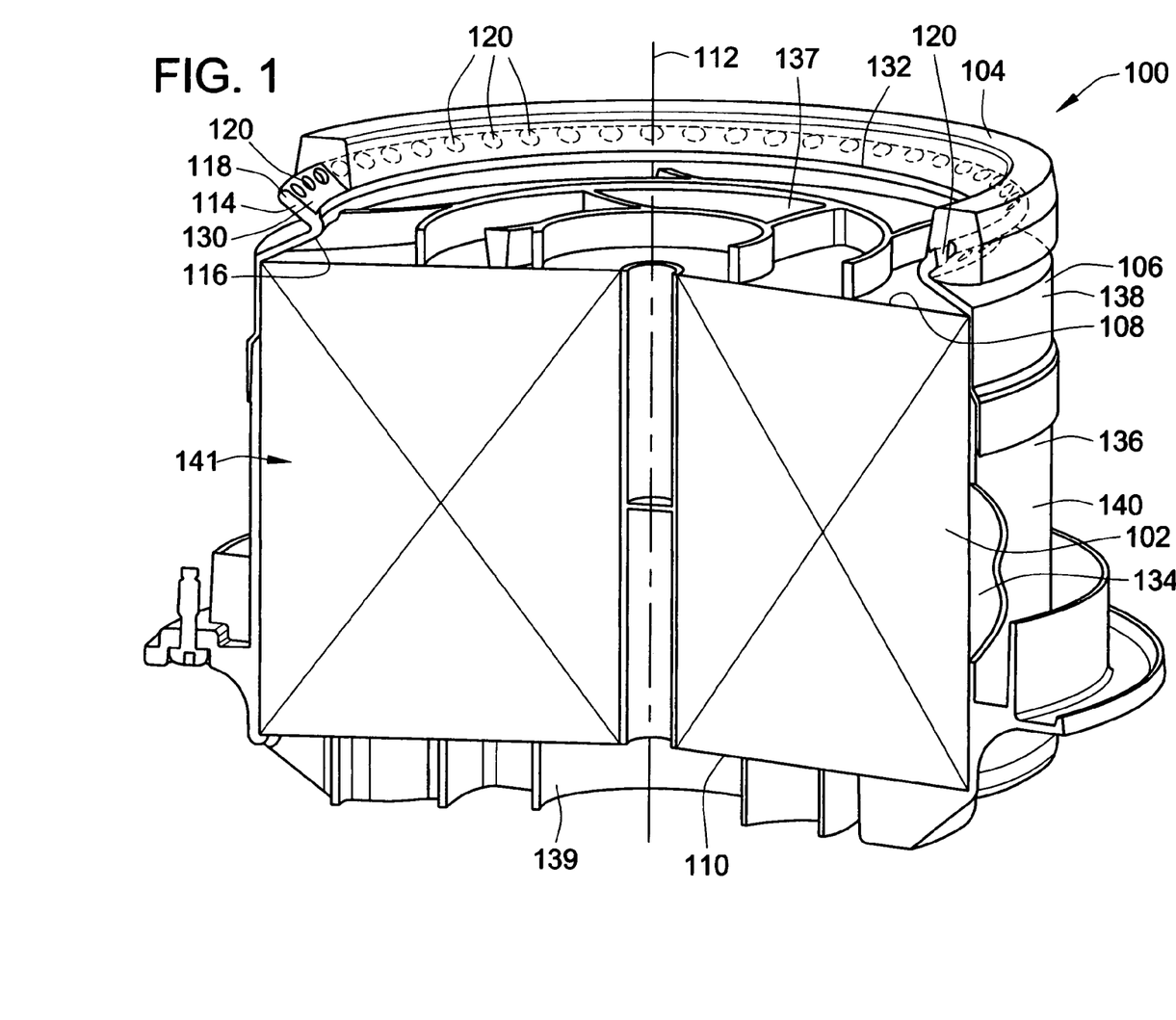
FIG. 1 is a perspective partial cross-sectional view of a first exemplary embodiment of the invention, in the form of a filter element, adapted for insertion into a filter housing, but not including the filter housing.
Figure 2:
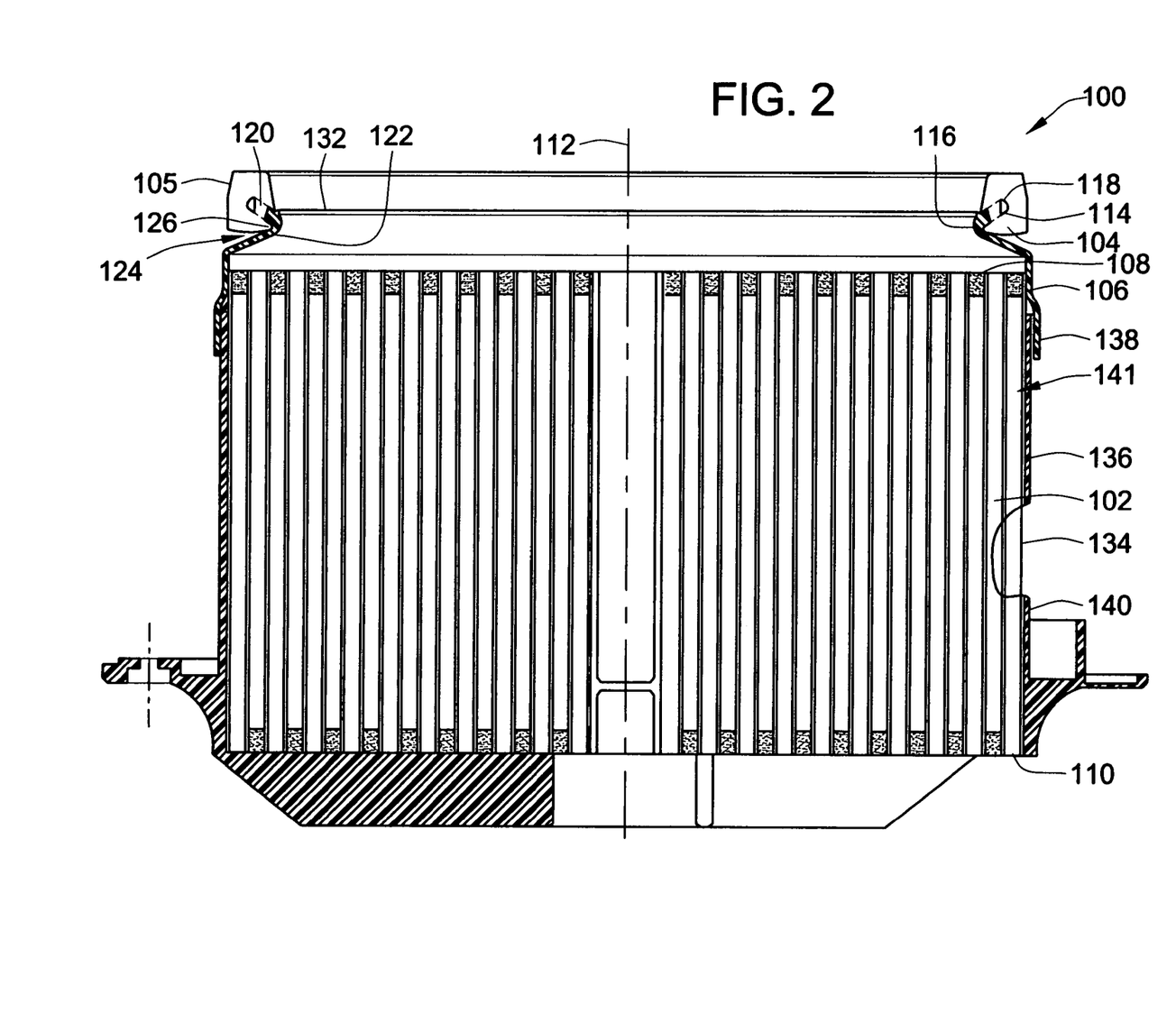
FIG. 2 is an orthographic cross section of the exemplary embodiment of FIG. 1.

FIGS. 1 and 2 show a first exemplary embodiment of the invention in the form of a filter element 100, adapted for insertion into a filter housing, but not including the filter housing, for removing particulate matter from a flow of fluid passing through the filter housing. The term fluid as used herein is intended to include fluids in either liquid or gaseous forms. The exemplary embodiments shown herein specifically illustrate an air filter of the type used for filtering intake air for engines and air compressors.

The filter element 100 includes a filter pack 102, a seal member 104, and a seal support frame 106 operatively connecting the seal member 104 to the filter pack 102. The filter pack 102 includes first and second oppositely facing flow faces 108, 110, and defines a longitudinal axis 112 passing through the first and second flow faces 108, 110. The seal support frame 106 including a canted annular extension 114 thereof, projecting from the first flow face 108 at an oblique angle to the longitudinal axis 112, for supporting the seal member 104.

The term "oblique," is used herein in accordance with the common dictionary meaning of that word to indicate that the canted annular extension 114 extends at an angle, with respect to the longitudinal axis 112, which is neither parallel nor perpendicular to the longitudinal axis 112. The term "annular," is also used herein, according to its common dictionary definition, to describe a variety of ring-like shapes disposed about an axis or centerline. Annular shapes, as contemplated by the inventors, may include, but are not limited to, shapes that are round, rectangular, oval, or race-track-like with two generally straight and parallel sides joined by rounded ends.

In the filter element 100 of the first exemplary embodiment, the canted annular extension includes a first end 116 and a distal end 118 thereof, with the first end 116 of the canted annular extension 114 being disposed nearer than the distal end 118 thereof to both the longitudinal axis 112 and the first flow face 108 of the filter pack 102, such that the canted annular extension 114 is canted outward from the longitudinal axis 112.

Figure 3:
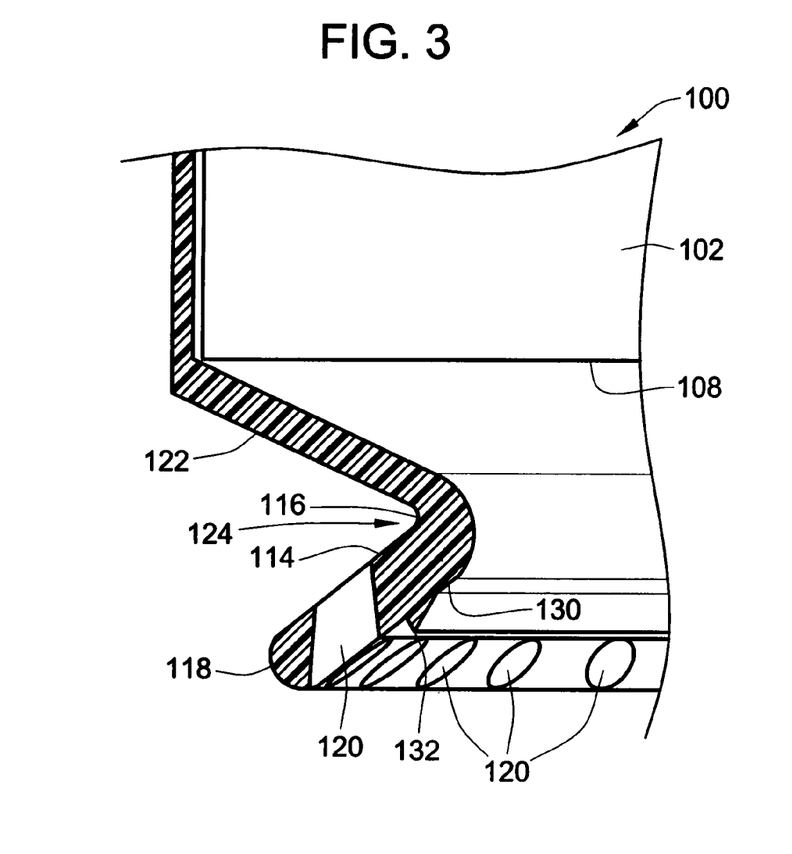
FIG. 3 is an orthographic partial cross section of an outwardly canted annular extension of a seal support frame of the exemplary embodiment of FIGS. 1 and 2, with a seal member not shown, for clarity of illustration.
Figure 4:
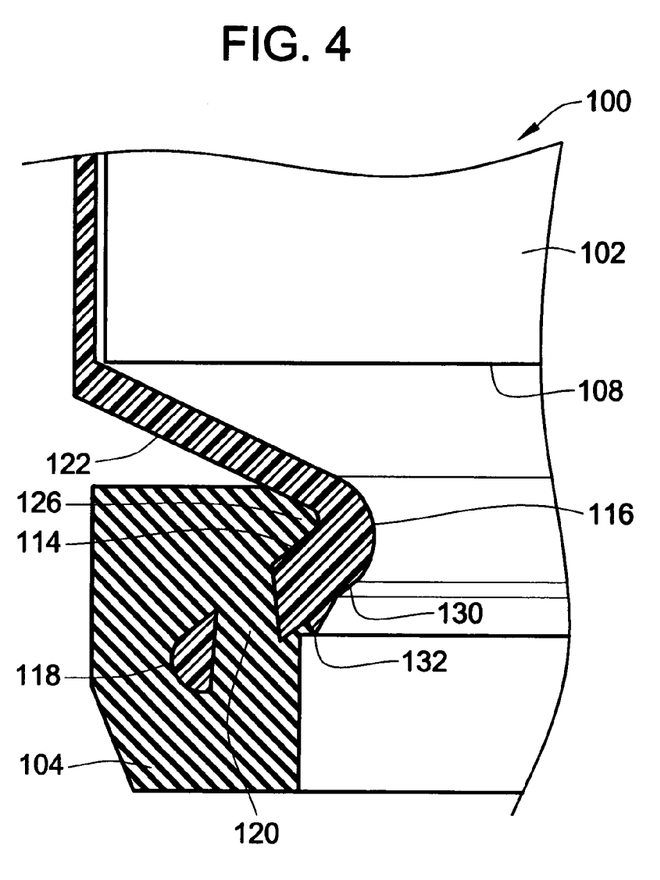
FIG. 4 is an orthographic partial cross section of an outwardly canted annular extension of a seal support frame of the exemplary embodiment of FIGS. 1-3, that is identical to FIG. 3, but with the seal member shown.

The canted annular extension 114 includes a plurality of holes 120 extending therethrough, as best seen in FIG. 3, with the seal member 104 including a portion thereof extending through the holes 120 in the canted annular extension 114, as shown in FIG. 4, to help retain the seal member 104 on the canted annular extension 114. The seal support frame 106 of the filter element 100 also includes an inwardly canted intermediate annular segment 122 extending between the first end 116 of the canted annular extension 114 and the first flow face 108 of the filter pack 102, to thereby form a V-shaped, outwardly opening, annular groove 124 at the juncture of the canted annular extension 106 and the inwardly canted intermediate annular segment 122, for receipt therein of a portion 126 of the seal member 104.

Figure 5:
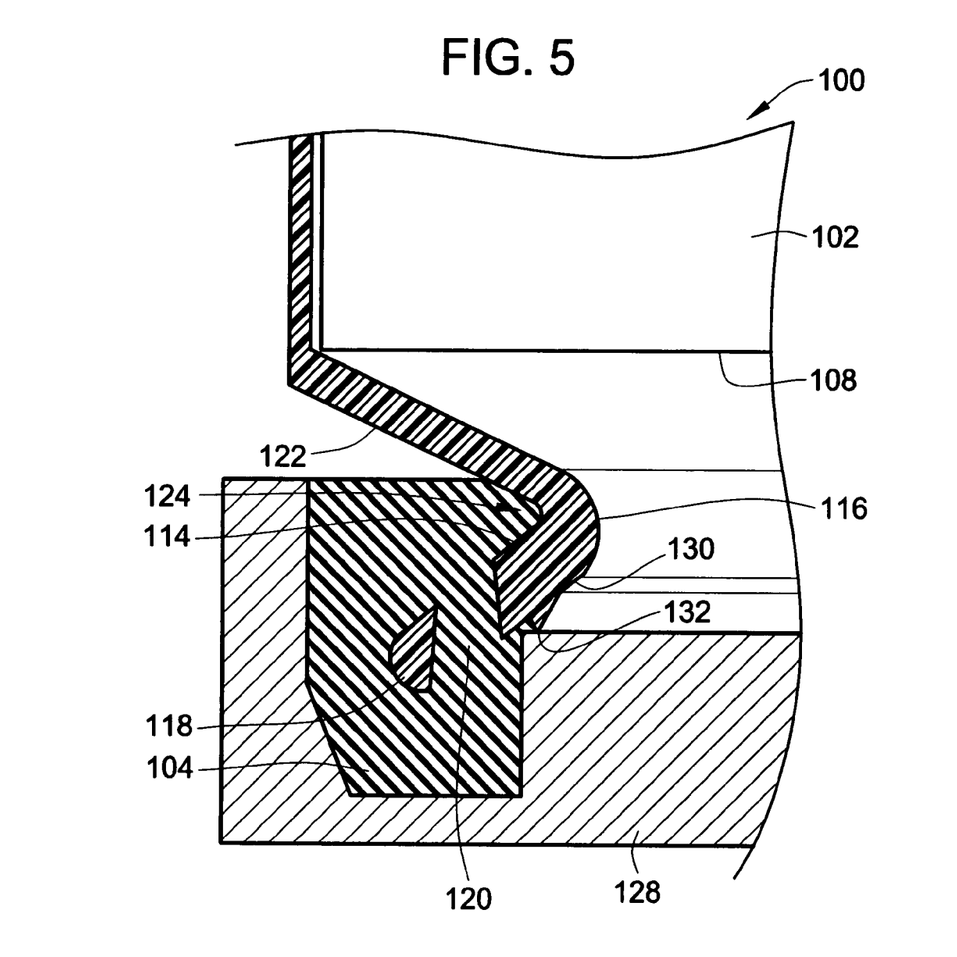
FIG. 5 is a schematic cross section, similar to FIGS. 3 and 4, illustrating a method for molding the seal member onto the canted annular extension.

As shown in FIG. 5, the seal member 104 in the filter element 100 is preferably formed from a material such as urethane foam, molded onto the canted annular extension 114 using a mold 128. During molding of the seal member 104, the filter element is placed into the mold 128 with the canted annular extension 114 facing downward, as shown in FIG. 5. A material used for forming the seal member 114 is placed in the mold 128 and allowed to foam and rise up around the canted annular extension 114, and through the holes 120 into the V-shaped groove 124 of the seal support frame 106. The canted annular extension 114 defines an inner surface 130 thereof, having a raised annular rib 132 extending therefrom for contacting and sealing against the mold 128, to thereby limit the extent of the seal member 104 along the inner surface 130 of the canted annular extension 114.

As shown in FIGS. 1 and 2, the filter pack 102 defines an outer periphery 134 thereof, and the seal support frame includes an outer peripheral sidewall 136 thereof adapted for circumscribing the outer periphery 134 of the filter pack 102. The seal support frame 106 includes a first end 138 thereof including the canted annular extension 114, and a second end 140 thereof, spaced from the first end thereof along the longitudinal axis 112. Each of the first and second ends 138, 140 of the seal support frame 106 include a skirt section thereof, which are joined together to form the outer peripheral sidewall 136 of the seal support frame 106, and to define a cavity 141 within the seal support frame 106 for receiving the filter pack 102. The first and second ends 138, 140 of the seal support frame are further configured such that, when the first and second ends 138, 140 of the seal support frame 106 are joined to one another, the filter pack 102 is retained within the cavity 141 of the seal support frame 106.

Figure 6:
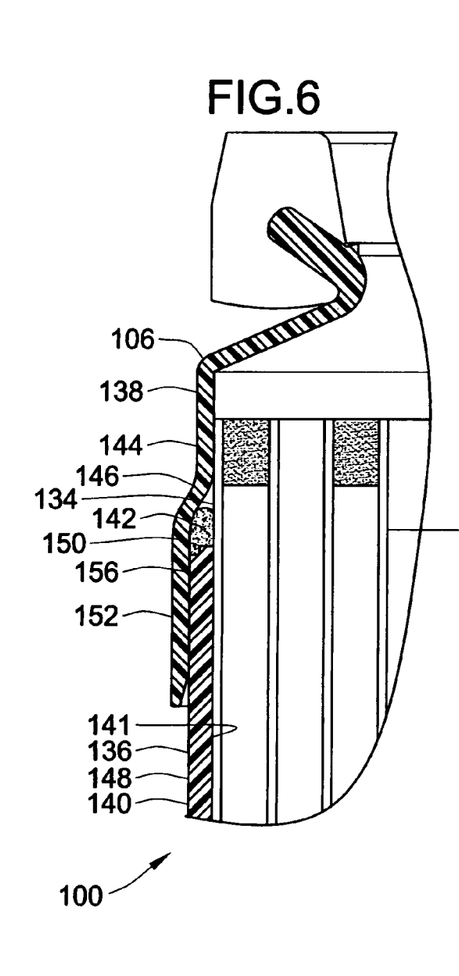
FIGS. 6 and 7 are orthographic cross sections taken respectively through, and between, raised locating ribs of the seal support frame.
Figures 7, 8:
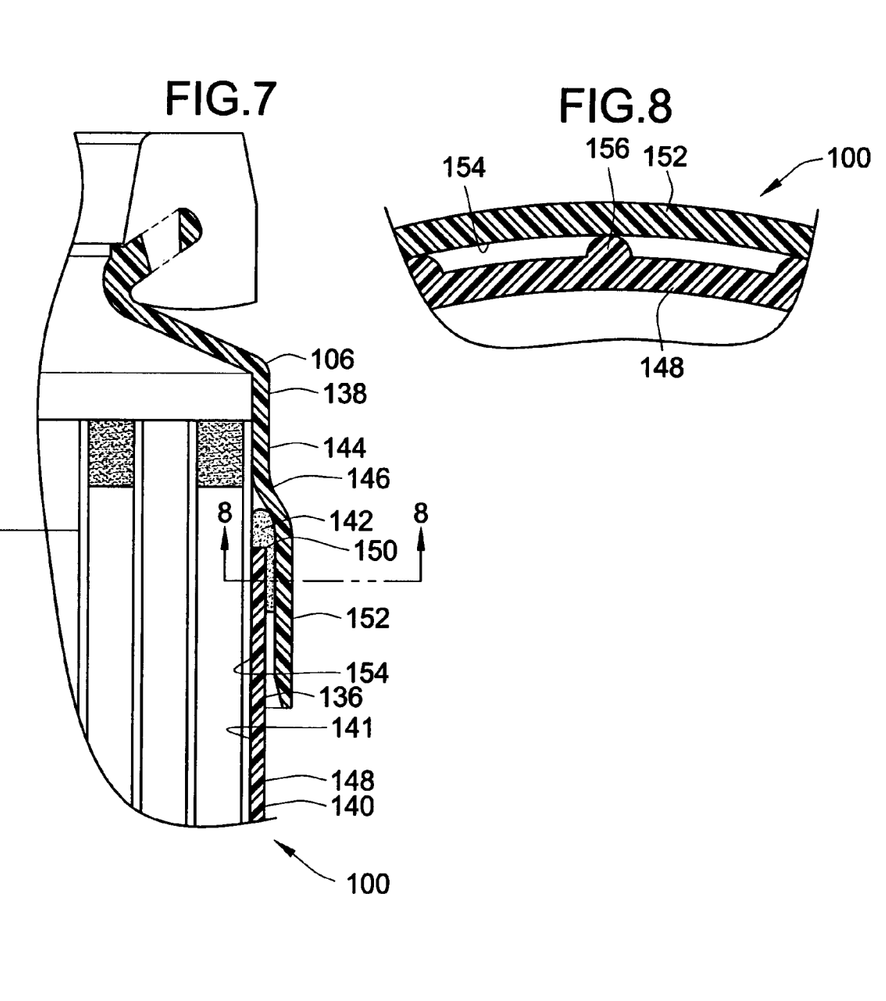
FIG. 8 is a partial cross sectional view cutting transversely through one of the raised ribs of FIG. 7, along line 8-8 of FIG. 7.

In the exemplary embodiment of the filter element 100, the first and second ends 138, 140 of the seal support frame 106 are joined to one another and sealed to the outer periphery 134 of the filter pack 106 by a single annular bead of adhesive 142, as best seen in FIGS. 6 and 7. The single annular bead of adhesive 142 performs the dual functions of simultaneously joining the first and second ends 138, 140 of the seal support frame 106 to the outer periphery 134 of the filter pack 106, and providing a seal blocking fluid flow between the outer periphery 134 of the filter pack 102 and an inner surface of the peripheral annular sidewall 136. In other embodiments of the invention, more than one bead of sealant may be used, or one or more non-continuous beads of sealant may be used. It is contemplated, however, that use of a single annular bead of adhesive 142 will generally be preferred, because the single annular bead 142 performing multiple functions will typically facilitate manufacture and reduce costs, in most embodiments of the invention.

By virtue of the construction of the seal support frame 106 of the filter 100, the outer peripheral sidewall 136 includes a first section 144 thereof extending from the first end 138 of the seal support frame 106, and terminating in a distal end 146 of the first section 144 of the outer peripheral sidewall 136. The outer peripheral sidewall 136 also includes a second section 148 thereof, that extends from the second end 140 of the seal support frame 106 and terminates in a distal end 150 of the second section 148 of the outer peripheral sidewall 106.

The first and second sections 144, 148 of the outer peripheral sidewall 136 are joined together with a joint formed by a hub 152 integrally formed with and extending from the distal end 146 of the first section 144 of the outer peripheral sidewall 136, with the hub 152 being adapted for receiving the distal end 150 of the second section 148 of the outer peripheral sidewall 136. The hub 152 is configured such that an inner surface 154 of the hub 152, is spaced from the distal end 150 of the second section 148 of the outer peripheral sidewall 136 to form a gap for receiving a portion of the bead of adhesive 142.

As shown by FIGS. 6-8, in the seal support frame 106 of the exemplary embodiment of the filter element 100, the second section 148 of the outer peripheral sidewall 136 includes a plurality of raised ribs 156 that extend outward from the second section 148 of the outer peripheral sidewall 136, adjacent the distal end 150 of the second section 148 of the outer peripheral sidewall 136, for spacing the inner surface 154 of the hub 152 from the distal end 150 of the second section 148 of the outer peripheral sidewall 136 of the seal support frame 106. The ribs 156 ensure that a gap of a predetermined size will be maintained between the inner surface 154 of the hub 152 and the distal end 150 of the second section 148 of the outer peripheral sidewall 136 to allow a portion of the bead of adhesive 142 to remain in the gap when the first and second ends 138, 140 of the seal support frame 106 are joined to one another and to the outer periphery 134 of the filter pack 102.

In the exemplary embodiment of the filter element 100, the ribs 156 also perform a second function, by being sized to provide a press fit of the distal end 150 of the second section 148 of the outer peripheral sidewall 136 into the hub 152. The press fit allows the seal support frame 106 to be self-fixturing, to that once the first and second ends 138, 140 of the seal support frame 106 are pressed together to a desired height, the press fit will hold the first and second ends 138, 140 together at the desired height while the adhesive 142 is curing. This allows the filter element 100 to be removed from any press equipment used for assembly, and set aside for curing of the adhesive, thereby freeing up the press equipment for use in assembling another filter element 100.

The hub 152, the distal end 150 of the second section 148 of the outer peripheral side wall 136, and the outer periphery 134 of the filter pack 102 are preferably joined to one another, after the filter pack 102 is inserted into the portion the cavity 141 formed by the first end 138 of the seal support frame 106, by placing a single bead of adhesive 142, of a judiciously selected size, at the juncture of the distal end 146 of the first section 144 of the peripheral sidewall 136 and the hub 152 and the outer periphery of the filter pack 102, prior to inserting the distal end 150 of the second section 148 of the peripheral sidewall 136 into the hub 152. After placement of the bead of adhesive 142 in the hub 152, the distal end 150 of the second section 148 of the peripheral sidewall 136 is then inserted into the hub 152, and pressure is applied to the second end 140 of the seal support frame 106 to urge it into contact with the second face 110 of the filter pack 102, and to push the distal end 150 of the second section 148 into the hub 152. As the distal end 150 of the second section of the peripheral sidewall 136 moves into the hub 152, the adhesive forming the single bead of adhesive 142 is squeezed into gaps between an inner surface 154 of the hub 152, that is spaced from the distal end 150 of the second section 148 of the outer peripheral sidewall 136 to form a space for receiving an adhesive sealant for joining together the distal ends of the first and second sections of the outer peripheral sidewall. Once the distal end 150 of the second section 148 of the peripheral sidewall 136 has been pressed far enough into the hub 152 to achieve a desired overall height of the filter element 100, the press fit features described above allow the filter element 100 to be self-fixturing while the adhesive 142 is curing.

The components of the filter element 100 need not, however, be assembled in the same order, or by the method described above, in practicing the invention. It will be understood, by those having skill in the art, that in other embodiments of the invention, other arrangements, sequences, or methods may be used for forming and/or joining together component parts of a seal support frame, according to the invention. In other embodiments of the invention, for example, it may be desirable to have a filter pack captured within a seal support frame, according to the invention, but to not have the outer periphery joined to the seal support frame by an adhesive. It will also be understood that, although the outer peripheral sidewall 136 of the seal support frame 106 of the exemplary embodiment the filter element 100 is imperforate, in other embodiments of the invention the outer peripheral sidewall may include one or more openings extending therethrough.

As shown in FIG. 1, the first and second ends 138, 140 of the seal support frame 106 of the exemplary embodiment of the filter element 100 also respectively include a first end flow face screen 137 and a second end flow face screen 139, that provide protection against physical damage for the first and second flow faces 108, 110 of the filter pack 102. The first and second flow face screens 137, 139 also serve to resist forces on the filter pack 102 that are exerted in a direction parallel to the longitudinal axis 112 by fluid flowing through the filter pack 102. In the exemplary embodiment of the filter element 100, the first and second flow face screens 137, 139 are formed integrally with the seal support frame 106. In other embodiments of the invention, however, such flow face screens may be separate components, attached to or held in place by the seal support frame, or may be eliminated.

Those having skill in the art will recognize that in embodiments of the invention having a canted annular extension, as described above, the canted extension provides a convoluted ring-like structure that is inherently stiff in the radial direction, for resisting compression forces imposed on the seal member when the filter element is inserted into a housing. As a result of this inherent stiffness, it is not necessary, in some embodiments of the invention, for the flow face screens 137, 139 to provide appreciable radial stiffening of the seal support.

Figure 9:
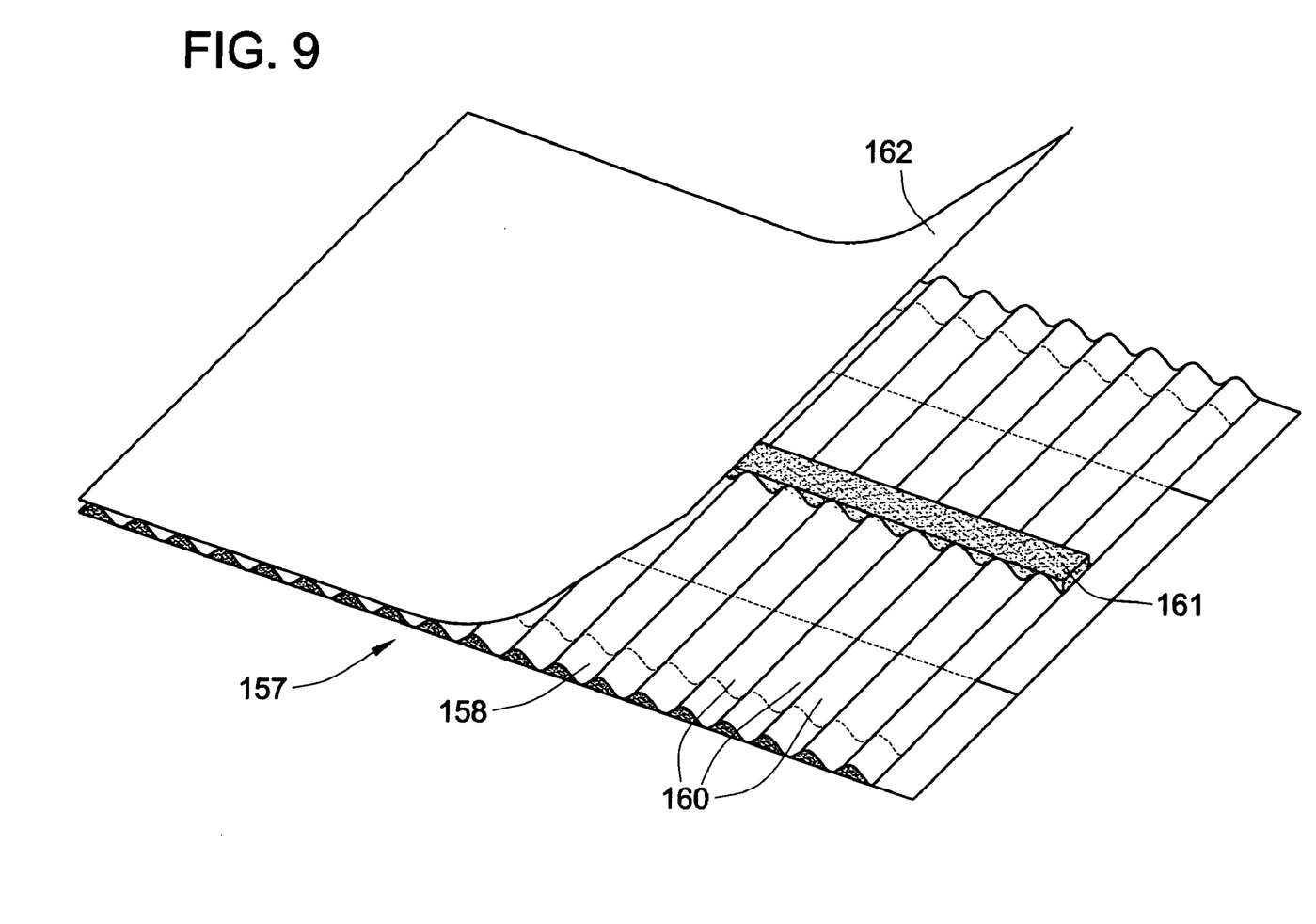
FIG. 9 is a perspective illustration of a fluted filter media, used in exemplary embodiments of the invention.

The filter pack 102 of the exemplary embodiment of the filter element 100 is formed from a filter media 157, as shown in FIG. 9, that includes a convoluted sheet 158 of porous filter material, for removing particulate matter from a fluid that is directed through the filter element 100. The convoluted sheet 158 may be formed by any appropriate process, such as corrugating or pleating, but preferably by gathering, as described in a U.S. patent application Ser. No. 10/979,390, entitled "Gathered Filter Media and Method of Making Same," assigned to the Assignee of the present invention, filed concurrently herewith and incorporated herein by reference.

The convoluted sheet 158 of porous filter material, of the filter media 157, forms a plurality of contiguous adjacent convolutions 160, commonly known in the industry as flutes. Selected ends of the flutes 160 of the filter media 157 may be blocked, with a bead of adhesive for example, to cause fluid entering one end of some of the flutes 160 to flow through the porous filter media into other flutes 160 prior to exiting the filter media 157 at an opposite end of the flutes 160, in the manner known in the art. Selected flutes may also include an intermediate seal 161, as disclosed in a U.S. patent application Ser. No. 10/979,453, entitled "Fluted Filter Media with Intermediate Flow Restriction and Method of Making Same," assigned to the Assignee of the present invention, filed concurrently herewith and incorporated herein by reference.

The fluted filter media 157 of the exemplary embodiment of the filter element 100 also includes a face sheet 162 attached to the convoluted sheet 158, for retaining the convoluted sheet 158 of porous filter material in a convoluted state. The term face sheet, as used herein, is intended to encompass any form of sheet or strip of generally flat, porous or non-porous, material attached to the convoluted sheet 158 of porous filter material. In the exemplary embodiment, it is contemplated that the face sheet 162 would preferably be formed of a porous filter material, in most embodiments of the invention.

Figure 10:
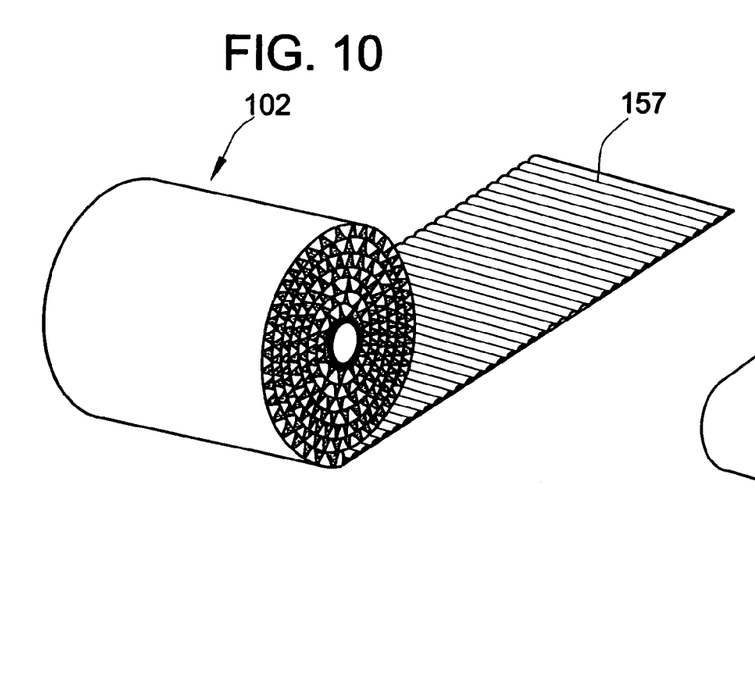
FIGS. 10 and 11 are perspective illustrations of optional cross sectional shapes for a filter pack, according to the invention.
Figure 11:
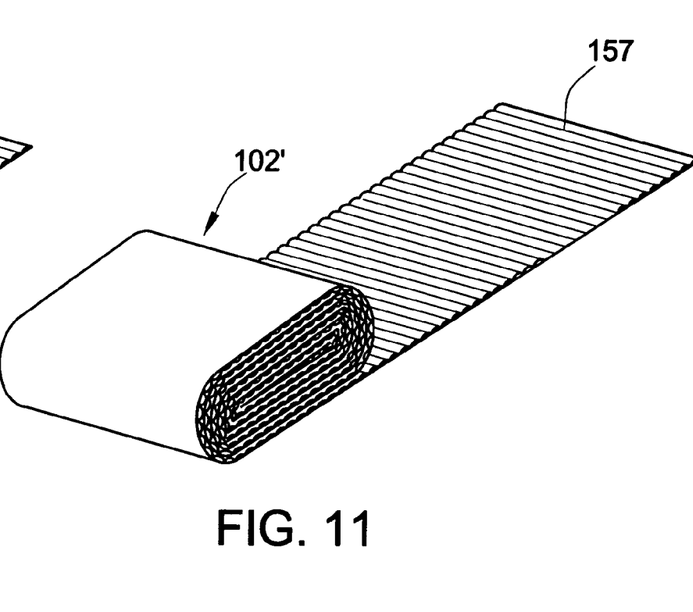

As shown in FIG. 10, the filter pack 102 of the exemplary embodiment of the filter element 100 described above, is formed by coiling the filter media 157 to form a generally right-circular-cylinder-shaped structure, that is proportioned for insertion into a filter housing having a generally circular cross section. In other embodiments of the invention, however, a filter pack 102', and its associated filter element (not shown), may have a non-circular cross section, such as the race-track shaped filter shown in FIG. 11. Filter packs having other cross sectional shapes, such as square, rectangular, or polygonal, for example, may also be utilized, in other embodiments of the invention, by coiling or bonding together successive layers of a fluted filter media. It is also understood that the invention is not limited to filter packs of fluted filter media. Those having skill in the art will readily recognize that the invention may also be practiced with efficacy, using other types of filter media.

Figure 12:
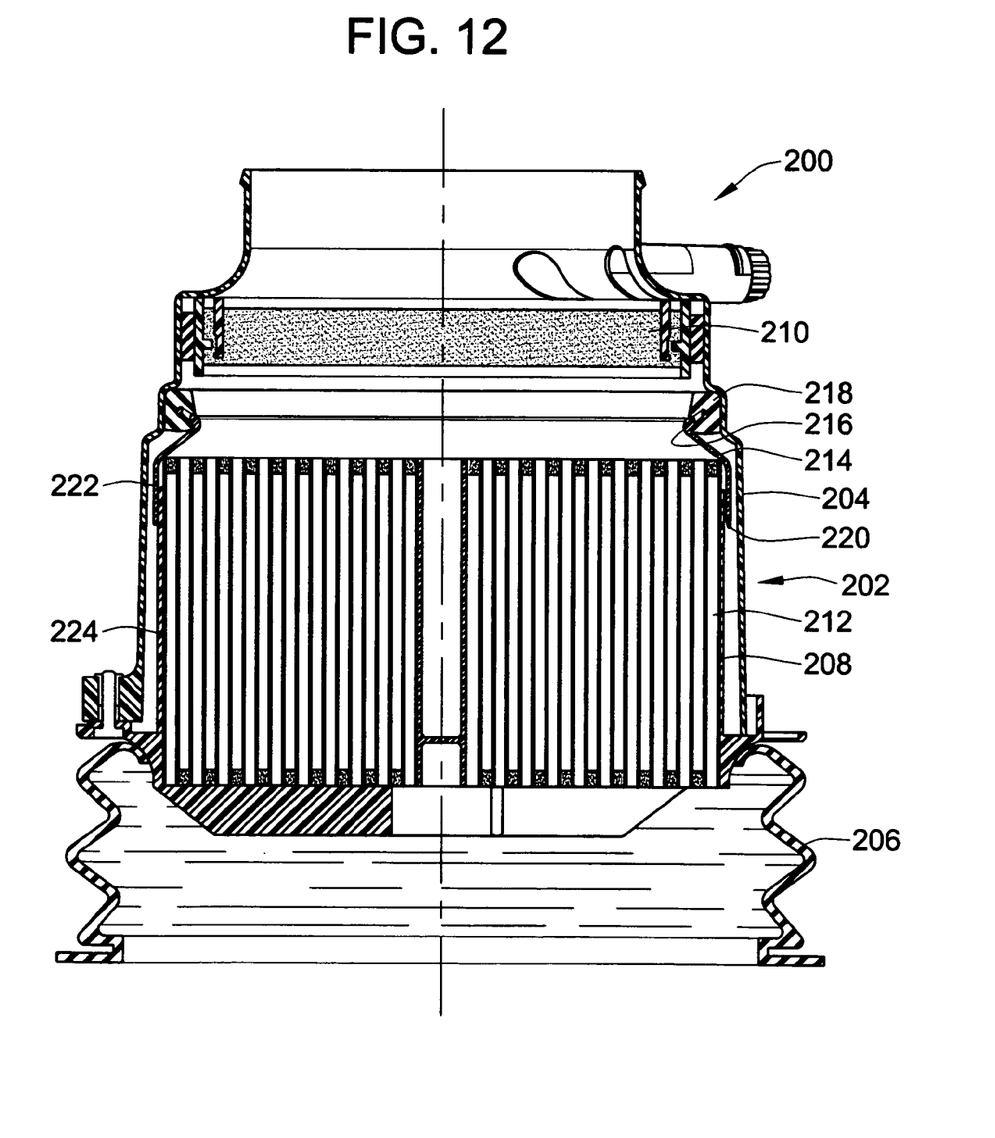
FIG. 12 is an orthographic cross section of a second exemplary embodiment of the invention, in the form of a filter apparatus including a filter housing and a filter element adapted for attachment to the filter housing.

FIG. 12 shows a second exemplary embodiment of the invention, in the form of a filter apparatus 200, having a filter housing assembly 202 including a filter housing 204 and a boot 206, adapted for attachment thereto of a filter element 208. The filter element 208 is of the cartridge type described herein. In contrast to the first exemplary embodiment of the invention, however, in which the filter apparatus included only the filter element 100, and not the filter assembly to which the filter element 100 is adapted to be attached, the second exemplary embodiment of the invention includes both the filter element 208 and the filter assembly 202 formed by the housing 204 and the boot 206. It should be further noted that the filter apparatus 200 of the second exemplary embodiment also includes a safety filter 210, mounted in the filter housing 204 at a point in the fluid flowpath downstream from the filter cartridge 208. Other embodiments of a filter apparatus, according to the invention, may include fewer or more components than the filter assembly 200 of the second exemplary embodiment.

The filter element 208 of the filter apparatus 200 is generally of the type described above in relation to the first exemplary embodiment. Specifically, the filter element 208 of the filter apparatus 200 includes a generally right-circular-cylinder shaped filter pack 212 of fluted filter media, and a seal support frame 214 having an outwardly canted annular extension 216 supporting a seal member 218 molded to the outwardly canted extension 216, in the same manner as described above in relation to the filter element 100 of the first exemplary embodiment. The seal support frame 214 of the filter element 208 of the filter apparatus 200 of the second exemplary embodiment is also a two part structure including a hub arrangement 220 for joining an upper frame section 222 and a lower frame section 224 (as oriented in FIG. 12) together and to the outer periphery of the filter pack with a single annular bead of adhesive (not shown) in the same manner as described above in relation to the first exemplary embodiment of the invention.

Figure 13:
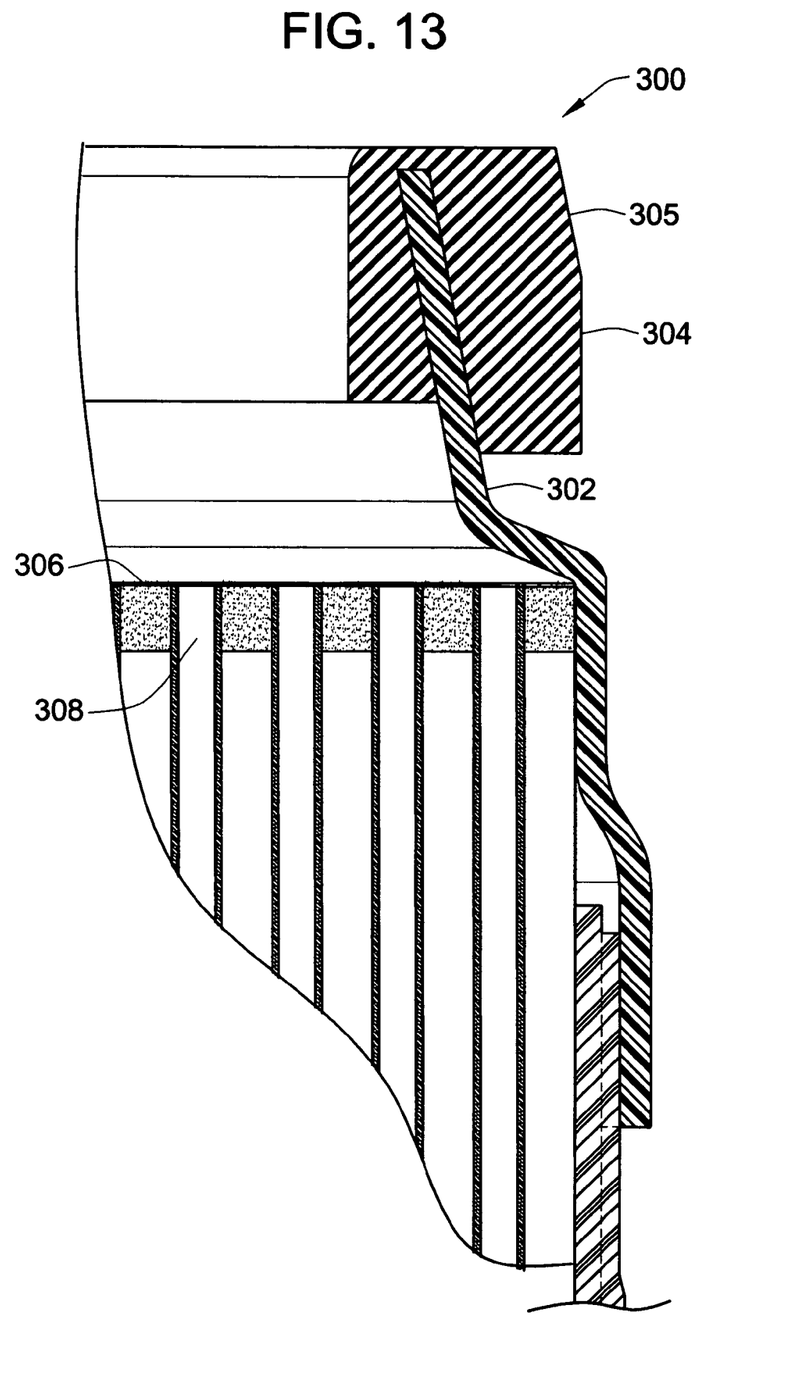
FIG. 13 is a partial orthographic cross section of an alternate embodiment of the invention, including an annular extension which is canted inward.

Those having skill in the art will recognize that, although invention has been described herein with reference to several exemplary embodiments, many other embodiments of the invention are possible. For example, as shown in FIG. 13, in other embodiments of invention, a filter element 300 may include an annular extension 302 that is canted inward, rather than being canted outward as shown and described in relation to the first and second exemplary embodiments of the invention described above. Such an inwardly canted annular extension may or may not include through holes for receiving and retaining a portion of a seal member 304 molded, in situ, onto the annular extension 302. Those having skill in the art will recognize that having the annular extension 302 canted inward results in the distal end of the annular extension 302 having a smaller periphery than the portion of the annular extension adjacent the flow face 306 of the filter pack 308. As a result of this construction, insertion and removal of the filter element 300 is facilitated by having the compressive forces on the seal 304 be generally proportional to the axial engagement length of the seal member 304 with an inside wall of a housing (not shown).

As shown in FIGS. 2 and 13, a seal member 104, 304 according to the invention may include a lead in chamfer 105, 305 to facilitate insertion of a filter element 100, 300, according to the invention, into a filter housing. It is also understood that, in an embodiment of the invention, the seal member may or may not be fixedly attached to the annular extension of a seal support frame according to the invention.

It is also contemplated that an embodiment of the invention including a seal support frame having an outer peripheral sidewall, adapted for circumscribing the outer periphery of the filter pack, a first end thereof including an annular extension, and a second end thereof spaced from the first end thereof along the longitudinal axis, with the first and second ends of the seal support frame joined by the outer peripheral sidewall of the seal support frame to define a cavity within the seal support frame for receiving the filter pack, may include an annular extension which is not canted either inward or outward.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
   a filter pack, a seal member, and a seal support frame operatively connecting the seal member to the filter pack, the seal member being formed separately from the seal support frame;
   the filter pack having first and second oppositely facing flow faces, and defining a longitudinal axis passing through the first and second flow faces; and
   the seal support frame including a canted annular extension thereof, for supporting the seal member, the canted annular extension projecting from one of the first and second flow faces of the filter pack at an oblique angle to the longitudinal axis, and having a first end and a distal end thereof;
   the seal support frame further including an inwardly canted intermediate annular segment extending between the first end of the canted annular extension and the one of the first and second flow faces of the filter pack, to thereby form a V-shaped, outwardly opening, annular groove at the juncture of the canted annular extension and the inwardly canted intermediate annular segment.

2. The filter element of claim 1, wherein the filter pack includes a fluted filter media having a plurality of flutes of porous filter material.

3. The filter element of claim 1, wherein the distal end of the canted annular extension is disposed nearer than the first end thereof to the longitudinal axis, such that the canted annular extension is canted inward with respect to the longitudinal axis.

4. The filter element of claim 3, wherein the canted annular extension includes one of more holes extending therethrough, and the seal member includes a portion thereof extending through one or more of the one or more holes in the canted annular extension.

5. The filter element of claim 1, wherein the first end of the canted annular extension is disposed nearer than the distal end thereof to the longitudinal axis, such that the canted annular extension is canted outward from the longitudinal axis.

6. The filter element of claim 5, wherein the seal member is molded onto the canted annular extension using a mold, and the canted annular extension defines an inner surface thereof having a raised annular rib extending therefrom for contacting and sealing against the mold, to thereby limit the extent of the seal member along the inner surface of the canted annular extension.

7. The filter element of claim 5, wherein the canted annular extension includes one or more holes extending therethrough, and the seal member includes a portion thereof extending through one or more of the one or more holes in the canted annular extension.

8. The filter element of claim 7, wherein the seal member is molded onto the canted annular extension using a mold, and the canted annular extension defines an inner surface thereof having a raised annular rib extending therefrom for contacting and sealing against the mold, to thereby limit the extent of the seal member along the inner surface of the canted annular extension.

9. The filter element of claim 5, wherein a portion of the seal member extends into the V-shaped annular groove.

10. The filter element of claim 8, wherein the canted annular extension includes one of more holes extending therethrough, and the seal member includes a portion thereof extending through one or more of the one or more holes in the canted annular extension.

11. A filter element comprising:
    a filter pack, a seal member, and a seal support frame operatively connecting the seal member to the filter pack;
    the filter pack having first and second oppositely facing flow faces, and defining a longitudinal axis passing through the first and second flow faces; and
    the seal support frame having an outer peripheral sidewall, adapted for circumscribing the outer periphery of the filter pack;
    the seal support frame also having a first end thereof including an annular extension, and a second end thereof spaced from the first end thereof along the longitudinal axis, with the first and second ends of the seal support frame joined by the outer peripheral sidewall of the seal support frame to define a cavity within the seal support frame for receiving the filter pack;
    the outer peripheral sidewall of the seal support frame including a first section thereof extending from one of the first or second ends of the seal support frame and terminating in a distal end of the first section of the outer peripheral sidewall, and a second section thereof extending from the other of the first and second ends of the seal support frame and terminating in a distal end of the second section of the outer peripheral sidewall;

the first and second sections of the outer peripheral sidewall being joined together by a hub extending from the distal end of one of the first or second sections of the outer peripheral sidewall, with the hub being adapted for receiving the distal end of the other of the first and second sections of the outer peripheral sidewall.

12. The filter element of claim 11, wherein the filter pack includes a fluted filter media having a plurality of flutes of porous filter material.

13. The filter element of claim 11, wherein the distal ends of the first and second sections of the outer peripheral side wall are joined to one another and sealed to the outer periphery of the filter pack by a single bead of adhesive forming a common bond and seal between the distal ends of the first and second sections of the outer peripheral sidewall of the seal support frame and the outer periphery of the filter pack.

14. The filter element of claim 11, wherein the hub, the distal end of the other of the first and second sections of the outer peripheral side wall, and the outer periphery of the filter pack are joined to one another by a single bead of adhesive forming a common bond between the hub, the outer periphery of the filter pack, and the distal end of the other of the first and second sections of the outer peripheral side wall of the seal support frame.

15. The filter element of claim 11, wherein the hub defines an inner surface thereof that is spaced from the distal end of the other of the first and second sections of the outer peripheral sidewall to form a space for receiving an adhesive sealant for joining together the distal ends of the first and second sections of the outer peripheral sidewall.

16. The filter element of claim 15, further comprising an adhesive disposed in the space between the inner surface of the hub and the distal end of the other of the first and second sections of the outer peripheral sidewall, for joining together the first and second sections of the outer peripheral sidewall.

17. The filter element of claim 16, wherein the adhesive forms a common joint between the distal ends of the first and second sections of the outer peripheral sidewall of the seal support frame and the outer periphery of the filter pack.

18. The filter element of claim 15, wherein the seal support frame further comprises a plurality of raised ribs attached to the inner surface of the hub or the distal end of the other of the first and second sections of the outer peripheral sidewall, for spacing the inner surface of the hub from the distal end of the other of the first and second sections of the outer peripheral sidewall.

19. The filter element of claim 18, further comprising an adhesive disposed in the space between the inner surface of the hub and the distal end of the other of the first and second sections of the outer peripheral sidewall, for joining together the first and second sections of the outer peripheral sidewall.

20. The filter element of claim 19, wherein the adhesive forms a common joint between the distal ends of the first and second sections of the outer peripheral sidewall of the seal support frame and the outer periphery of the filter pack.

21. A filter element, comprising:
a filter pack having oppositely facing first and second flow faces and defining an axis extending through the first and second flow faces, the filter pack having an outer filter pack surface extending transversely between the first and flow faces;
a seal support frame including an annular extension disposed at least partially over the second flow face, the seal support frame having an inner surface facing inwardly generally toward the axis and an outer surface facing generally outwardly away from the axis;
an annular seal member molded along the annular extension; and
an annular mold contact formed along the inner surface of the seal support frame, the annular mold contact disposed inwardly of the annular seal member along the inner surface relative to the axis.

22. The filter element of claim 21, wherein the annular mold contact is provided by an annular rib projecting from the seal support frame.

23. The filter element of claim 22, wherein the annular rib is pointed in a direction that is different than an extending direction of the annular extension.

24. The filter element of claim 21, wherein the seal support further includes a canted annular segment joined to the annular extension at a bend, the canted annular segment extending generally between the annular extension and the second flow face, the annular mold contact preventing mold material from rising along the inner surface along the canted annular segment.

25. The filter element of claim 24, further comprising an annular sidewall joined to the canted annular segment, the annular sidewall extending around the outer filter pack surface.

26. The filter element of claim 21, wherein the seal member is molded over the outer surface of the seal support frame to provide an annular outer seal surface adapted for forming a radial seal, and wherein the seal member is also molded over an end of the annular extension and along the inner surface to provide an annular inner seal surface, the annular inner surface being disposed outwardly of the mold contact relative to the axis.

27. The filter element of claim 21, wherein the annular mold contact defines a smaller inner perimeter than an inner perimeter of the annular seal member.

28. The filter element of claim 21, wherein the filter pack is a fluted media having a plurality of flutes including a first set of flutes that are closed proximate to the first flow face and a second set of flutes that are closed proximate to the second flow face, the fluted media pack having a fluted sheet joined to a face sheet which are wound about the axis into an annular shape.

29. The filter element of claim 28, wherein said seal support frame integrally includes a flow face screen extending over the second face.

30. A filter element, comprising:
a filter pack having oppositely facing first and second flow faces and defining an axis extending through the first and second flow faces, the filter pack having an outer filter pack surface extending transversely between the first and flow faces;
a seal support frame including an annular extension disposed at least partially over the second flow face, the seal support frame having an inner annular surface facing inwardly generally toward the axis and an outer annular surface facing generally outwardly away from the axis;
an annular seal member molded around the annular extension along the inner annular surface and the outer annular surface; and an annular mold contact formed along the inner surface of the seal support frame, the annular mold contact preventing flow of mold material along the inner surface such that the annular seal member extends a greater distance toward the first flow face over the outer annular surface as compared to the inner annular surface.

31. The filter element of claim 30, wherein the annular mold contact is provided by an annular rib projecting from the seal support frame.

32. The filter element of claim 31, wherein the annular rib is pointed in a direction that is different than an extending direction of the annular extension.

33. The filter element of claim 32, wherein the seal support further includes a canted annular segment joined to the annular extension at a bend, the canted annular segment extending generally between the annular extension and the second flow face, the annular mold contact preventing mold material from rising along the inner surface along the canted annular segment.

34. The filter element of claim 30, further comprising an annular sidewall joined to the canted annular segment, the annular sidewall extending around the outer filter pack surface.

35. The filter element of claim 30, wherein the annular mold contact defines a smaller inner perimeter than an inner perimeter of the annular seal member.

36. The filter element of claim 30, wherein the filter pack is a fluted media having a plurality of flutes including a first set of flutes that are closed proximate the first flow face and a second set of flutes that are closed proximate the second flow face, the fluted media pack having a fluted sheet joined to a face sheet which are wound about the axis into an annular shape.

37. The filter element of claim 36, wherein said seal support frame integrally includes a flow face screen extending over the second face.

38. The filter element of claim 30 wherein the seal support frame defines a plurality of holes and wherein the seal member includes seal material extending through the holes.

39. A filter element, comprising:
a filter pack having oppositely facing first and second flow faces and defining an axis extending through the first and second flow faces, the filter pack having an outer filter pack surface extending transversely between the first and flow faces;
a seal support frame including an annular extension disposed at least partially over the second flow face, the seal support frame having an inner surface facing inwardly generally toward the axis and an outer surface facing generally outwardly away from the axis;
an annular seal member molded along the annular extension at least partially over the inner surface; and
annular rib projecting from the seal support frame along the inner surface, the annular rib being disposed between the seal material along the inner surface and the second flow face.

40. The filter element of claim 39, wherein the annular rib is pointed in a direction that is different than an extending direction of the annular extension.

41. The filter element of claim 40, wherein the seal support further includes a canted annular segment joined to the annular extension at a bend, the canted annular segment extending generally between the annular extension and the second flow face, the annular rib separating mold material along the inner surface from the canted annular segment.

42. The filter element of claim 41, further comprising an annular sidewall joined to the canted annular segment, the annular sidewall extending around the outer filter pack surface.

43. The filter element of claim 41, wherein the seal member is molded over the outer surface of the seal support frame to provide an annular outer seal surface adapted for forming a radial seal, and wherein the seal member is also molded over an end of the annular extension and along the inner surface to provide an annular inner seal surface, the annular inner surface being disposed outwardly of the annular rib relative to the axis.

44. The filter element of claim 43, wherein the filter pack is a fluted media having a plurality of flutes including a first set of flutes that are closed proximate to the first flow face and a second set of flutes that are closed proximate to the second flow face, the fluted media pack having a fluted sheet joined to a face sheet which are wound about the axis into an annular shape.

45. The filter element of claim 44, wherein said seal support frame integrally includes a flow face screen extending over the second face.

46. The filter element of claim 39, wherein the annular rib defines a smaller inner perimeter than an inner perimeter of the annular seal member.

* * * * *

UNITED STATES PATENT AND TRADEMARK OFFICE
CERTIFICATE OF CORRECTION

| | |
|---|---|
| PATENT NO. | : 7,318,851 B2 |
| APPLICATION NO. | : 10/979876 |
| DATED | : January 15, 2008 |
| INVENTOR(S) | : Gene W. Brown et al. |

It is certified that error appears in the above-identified patent and that said Letters Patent is hereby corrected as shown below:

<u>Column 10</u>

Line 44, Claim 10, Change claim "8" to -- 9 --.

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,318,851 B2 | Page 1 of 1 |
| APPLICATION NO. | : 10/979876 | |
| DATED | : January 15, 2008 | |
| INVENTOR(S) | : Gene W. Brown et al. | |

It is certified that error appears in the above-identified patent and that said Letters Patent is hereby corrected as shown below:

Column 12

Line 3, "first and flow faces" should read --first and second flow faces--.

Line 58, "first and flow faces" should read --first and second flow faces--.

Column 13

Line 46, "first and flow faces" should read --first and second flow faces--.

Signed and Sealed this
Thirtieth Day of August, 2011

David J. Kappos
*Director of the United States Patent and Trademark Office*